Patented July 29, 1952

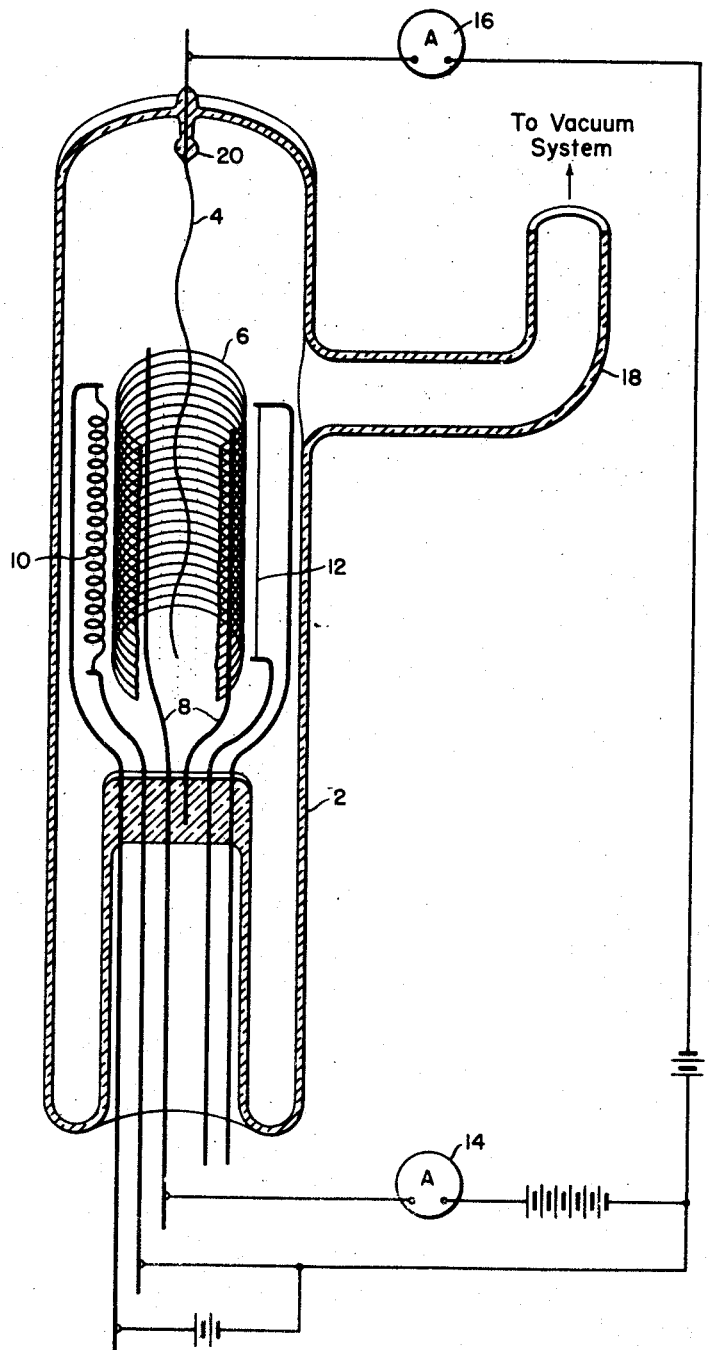

2,605,431

UNITED STATES PATENT OFFICE 2,605,431

IONIZATION VACUUM GAUGE

Robert T. Bayard, Turtle Creek, Pa., assignor to Westinghouse Electric Corporation, East Pittsburgh, Pa., a corporation of Pennsylvania Application March 30, 1950, Serial No. 152,915

8 Claims. (Cl. 313—7)

My invention relates to a vacuum gauge and more particularly to an ionization vacuum gauge.

In accordance with the prior art of which I am aware, ionization vacuum gauges have been built wherein ionization is produced by electrons of high velocity moving inside a glass tube. A cathode is provided in the center of the tube which is surrounded by an acceleration electrode of wire mesh. External to the acceleration electrode is a plate or ion collector which is negative with respect to the cathode. Electrons emitted from the cathode are accelerated by the acceleration electrode to high velocities. These electrons moving about th tube cause ionization of the gas within the tube, the number of ions produced per unit time being proportional to the pressure of the gas within the tube, provided that the other variables affecting the operation remain constant. The ions thus produced are collected by the ion collector electrode, and the current produced by these ions is measured to give an indication of the degree of vacuum within the tube.

This apparatus is reasonably satisfactory for some pressures, but its sensitivity is limited. It is not responsive at very low pressures.

It is, accordingly, an object of my invention to provide apparatus for measuring very low gas pressures.

Another object of my invention is to provide apparatus of the ionization gauge type for measuring gas pressure in a closed vessel.

An ancillary object of my invention is to provide a novel electronic apparatus.

My invention arises from the realization that the limitation in sensitivity and response at low pressures of the prior art device arises from X-rays produced by electrons striking the acceleration electrode with high velocities. These X-rays on striking the ion collector electrode cause the emission therefrom of electrons, thereby causing a response which is indistinguishable from that produced by ions impinging on the collector electrode.

In accordance with my invention, I provide a tube having therein a collector electrode of a fine wire of conducting material. Surrounding this collector electrode is an acceleration electrode, and external to the acceleration electrode is a cathode. The acceleration electrode has impressed thereon a potential which is positive with respect to the cathode. The collector electrode, which is located inside the acceleration electrode, has a potential impressed thereon which is negative with respect to the cathode and therefore also negative with respect to the acceleration electrode.

I have devised this apparatus on the assumption that the prior are devices were limited by the effect on the ion collector of X-rays produced by electrons impinging on the acceleration electrode. I have therefore provided a thin wire for the collector electrode and placed it inside the accelerator electrode. By this arrangement the ion collector is able to perform its function effectively, due to the fact that the positive ions, which are attracted by the negative potential on the ion collector electrode, are prevented from escaping into the space outside the accelerator electrode by the positive potential on that electrode. On the other hand, the amount of X-radiation which is intercepted by the ion collector electrode may be made arbitrarily small by making the ion collector electrode arbitrarily small.

In a preferred embodiment of my invention, I have provided a collector electrode comprising a thin wire which has a slightly helical shape. I have found that the lack of cylindrical symmetry provided by this shape prevents oscillations of the type known as Barkhausen oscillations from building up inside the tube. These oscillations can cause electrons to acquire sufficient energy to allow them to reach the ion collector electrode in spite of the negative potential, and thus to cause errors in the measurement of pressure.

I have also provided, in a preferred embodiment of my invention, for a bead of material which will not conduct electricity surrounding the collector electrode near the place where the collector electrode enters the main body of the surrounding tube. This bead of glass prevents metal evaporated from the metallic elements of the tube from settling in the region near where the collector electrode is attached to the main body of the tube. If this bead were not present, metal evaporated from the elements of the tube might settle over the interior of the tube and build a conducting layer on the inside of the tube which would be in contact with the collector electrode and thereby allow charge generated on the walls of the tube, due to X-rays impinging thereon, to flow to the ion collector electrode.

In using apparatus in accordance with my invention, I have found it capable of measuring very low pressures—pressures substantially below $10^{-8}$ mm. of mercury.

The novel features which I consider characteristic of my invention are set forth with more particularity in the appended claims. The invention, however, with respect to both the organization and the operation thereof, together with other objects and advantages may be best understood from the following description of specific embodiments when read in connection with the accompanying drawing, in which the single figure is a schematic showing partly in section of apparatus embodying my invention.

The apparatus shown in the drawing includes an envelope 2 of glass or other material which is impervious to gases. Attached near the center of one end of the tube and extending into the tube is a thin wire 4 of conducting material. This wire is rigidly attached to the end of the tube in such manner that it extends substantially down the center of the tube. This wire 4 is the ion collector electrode, the purpose of which is to collect the positive ions produced in the tube. Substantially surrounding the ion collector electrode 4 is a grid or accelerator electrode 6. The accelerator electrode 6 may consist of a thin wire mesh curved about the collector electrode and separated substantially therefrom, or as shown in the drawing, it may consist merely of a plurality of turns of a fine wire surrounding the collector electrode 4 and separated therefrom and from each other. The acceleration electrode 6 is supported by one or more supporting wires 8 which extend into and are attached to the wall of the tube 2. These supporting wires 8 may also be employed to supply current to the acceleration electrode. External to the acceleration electrode 6 but also inside the glass envelope is a primary heated cathode 10 comprising a spiral conductor. The primary cathode 10 is employed when larger pressures are being measured but due to its large surface area is not desirable when very low pressures are being measured. A secondary cathode 12, also exterior to the acceleration electrode, is provided which consists of a short length of very fine wire. The secondary electrode 12 is employed when it is desired to measure very low pressures. The secondary cathode 12 is of fine wire so that the power radiated from the surface of the cathode will produce a minimum of heat in the walls of the tube which heat would cause gases to evolve from the walls of the tube and thus produce false pressures in the tube. As shown in the drawing the primary cathode is connected to the potential source. When it is desired to measure lower pressures the primary cathode may be disconnected and allowed to remain and the secondary cathode connected. A potential is applied between one of the cathodes 10, 12 and accelerator electrode 6 such that the accelerator electrode is positive with respect to the cathode. The ion collector 4 has a potential applied thereto which is negative with respect to both the cathode and the acceleration electrode. In series with the acceleration electrode is a milliammeter 14 for measuring the current between the cathode 10 and the acceleration electrode 6, thereby determining the number of electrons passing through the tube. A microammeter 16 is connected in series with the ion collector electrode 4 to indicate the current through the ion collector due to the ions produced within the tube. Connected to the side of the tube 2 is a pipe 18 for connecting the tube to a vacuum system, the pressure in which is to be measured.

In the operation of apparatus embodying my invention, electrons from the cathode 10 are accelerated by the acceleration electrode 6 toward that electrode. Since the acceleration electrode 6 consists of a number of turns of a fine wire separated from each other by a substantial space, most of the electrons will pass through the acceleration electrode 6 into the region inside that electrode. Since the ion collector 4 is negative with respect to the other elements in the tube, the electrons will be repelled by it, and will move back toward the acceleration electrode 6. When the electrons inside the acceleration electrode 6, repelled by the ion collector 4 and attracted by the acceleration electrode reach the acceleration electrode only a few of them will be stopped by that electrode, the bulk of the electrons thus attracted will pass through the acceleration electrode into the region outside that electrode. The electrons which leave the cathode and are accelerated by the acceleration electrode are thus caused to oscillate back and forth in the tube. As these electrons move about inside the tube with high velocities, some of them will strike molecules of the gas inside the tube and thereby cause the ionization of that gas. The positive ions which are produced by this ionization are attracted toward the ion collector 4 which is highly negative.

If the current of electrons through the tube is held constant, the number of ions produced per unit time will be substantially proportional to the pressure of the gas inside the tube. Therefore since the current passing from the ion collector electrode through the milliammeter is proportional to the number of ions which reach the collector electrode per unit time, the reading on the microammeter 16 is an indication of the pressure in the tube.

In a preferred embodiment of my invention, the ion collector electrode 4 consists of a fine wire of slightly helical configuration. The helical configuration prevents oscillations of the electrons building up in synchronism over a substantial period of time, and thereby producing electrons with undesirably high velocities, which will be collected by the ion collector, causing either a reduction in, or a reversal in the sign of the reading of the microammeter 16.

In a preferred embodiment of my invention, I also provide a bead of glass 20 surrounding the ion collector and flanging outward about two millimeters. This bead of glass is located on the ion collector electrode 4 near where the ion collector electrode enters the wall 2 of the tube. The bead of glass 20 is desirable to prevent metal evaporated from the elements of the tube from forming a conducting layer over the interior of the tube, which, if connected to the ion collector electrode, would produce the equivalent of a very large ion collector electrode which would have the same disadvantage as that incorporated in the devices of the prior art, namely, interception of a large amount of X-radiation.

The bead of glass 20 flanging outward from the collector electrode 4 effectively casts a shadow on the wall of the tube around the place where the collector electrode enters the wall. This region around the collector electrode is thereby protected and remains non-conducting.

Tests have been made with apparatus of this type employing an ion collector electrode comprising a thin wire of .004 inch diameter. With this apparatus I have been able to measure accurately pressure as low as $5 \times 10^{-11}$ mm. of mercury which is an accurate reading of pressure at least two hundred times lower than was possible with any apparatus in the prior art of which I am aware.

Although I have shown and described specific embodiments of my invention, I am aware that other modifications thereof are possible. My invention, therefore, is not to be restricted except insofar as is necessitated by the prior art and the spirit of the invention.

I claim as my invention:

1. An ionization vacuum gauge comprising an envelope having therein an ion collector, an acceleration electrode surrounding said ion collector, and a cathode external to said acceleration electrode, said ion collector having cross-sectional dimensions which are only a very small fraction of the distance between said ion collector and said acceleration electrode, connections adapted to supply a negative potential to said cathode, a positive potential to said acceleration electrode, and a potential negative with respect to the potential of said cathode to said ion collector.

2. An ionization vacuum gauge comprising an envelope of material impervious to air, an ion collector in said envelope, an acceleration electrode surrounding said ion collector, and a cathode external to said acceleration electrode, said ion collector comprising a thin wire of conducting material.

3. An ionization vacuum gauge comprising an envelope having therein an ion collector comprising a conductor of very small cross-section, an acceleration electrode surrounding said ion collector and a cathode external to said acceleration electrode.

4. An ionization vacuum gauge comprising an envelope having therein an ion collector, an acceleration electrode surrounding said ion collector and a cathode external to said acceleration electrode, said ion collector comprising a fine wire of helical shape.

5. An ionization vacuum gauge comprising an envelope having therein an ion collector comprising a thin wire, an acceleration electrode surrounding said ion collector and a cathode external to said acceleration electrode, a bead of glass flaring out from said ion collector near the place where said ion collector joins the main body of said envelope and being separated from said envelope by a narrow neck of glass.

6. An ionization vacuum gauge comprising an envelope having therein an ion collector, and a bead of glass surrounding and extending outward from said ion collector near the region where said ion collector joins said envelope but at a substantial distance from said envelope.

7. An ionization vacuum gauge comprising an envelope having therein a cathode, an acceleration electrode, an ion collector, and a bead of glass surrounding and extending outward from said ion collector near where said ion collector joins said envelope and being separated from said envelope, said ion collector comprising a fine wire of helical shape.

8. An ionization vacuum gauge comprising an envelope having therein an ion collector, an acceleration electrode surrounding said ion collector, and a cathode external to said acceleration electrode, connections adapted to supply a potential to said cathode negative with respect to the potential of said acceleration electrode, and a potential negative with respect to the potential of said cathode to said ion collector, said ion collector comprising a fine wire of helical shape.

ROBERT T. BAYARD.

REFERENCES CITED

The following references are of record in the file of this patent:

UNITED STATES PATENTS

| Number | Name | Date |
|---|---|---|
| 1,334,143 | Dushman | Mar. 16, 1920 |
| 1,372,798 | Buckley | Mar. 29, 1921 |
| 2,269,082 | Herriger | Jan. 6, 1942 |
| 2,454,564 | Nelson | Nov. 23, 1948 |